(12) United States Patent
Delgado Puche

(10) Patent No.: US 7,637,969 B2
(45) Date of Patent: Dec. 29, 2009

(54) PROCEDURE TO OBTAIN BIODIESEL FUEL WITH IMPROVED PROPERTIES AT LOW TEMPERATURE

(75) Inventor: Juan Delgado Puche, Madrid (ES)

(73) Assignee: Industrial Management S.A., Madrid (ES)

( * ) Notice: Subject to any disclaimer, the term of this patent is extended or adjusted under 35 U.S.C. 154(b) by 563 days.

(21) Appl. No.: 10/329,322

(22) Filed: Dec. 23, 2002

(65) Prior Publication Data

US 2003/0167681 A1 Sep. 11, 2003

(51) Int. Cl.
*C10L 1/18* (2006.01)
(52) U.S. Cl. .............................. 44/308; 44/307; 44/388; 44/444; 44/447
(58) Field of Classification Search .................... 44/388, 44/307, 308, 444, 447
See application file for complete search history.

(56) References Cited

U.S. PATENT DOCUMENTS

| | | | | | |
|---|---|---|---|---|---|
| 4,397,655 | A | * | 8/1983 | Sweeney ...................... | 44/308 |
| 5,110,606 | A | * | 5/1992 | Geyer et al. ................. | 424/489 |
| 5,308,365 | A | * | 5/1994 | Kesling et al. ............... | 44/447 |
| 5,354,878 | A | * | 10/1994 | Connemann et al. ........ | 554/167 |
| 5,481,013 | A | * | 1/1996 | Maienfisch et al. ......... | 554/226 |
| 5,520,708 | A | | 5/1996 | Johnson et al. | |
| 5,830,830 | A | * | 11/1998 | Hille et al. ................... | 507/136 |
| 5,891,203 | A | | 4/1999 | Ball et al. .................... | 44/388 |
| 6,013,114 | A | * | 1/2000 | Hille et al. ................... | 44/308 |
| 6,015,440 | A | * | 1/2000 | Noureddini ................. | 44/388 |
| 6,174,501 | B1 | | 1/2001 | Noureddini | |
| 6,187,939 | B1 | | 2/2001 | Sasaki et al. ................. | 554/169 |
| 6,395,778 | B1 | * | 5/2002 | Luthria ........................ | 514/549 |
| 2003/0167681 | A1 | | 9/2003 | Puche ......................... | 44/388 |

FOREIGN PATENT DOCUMENTS

| | | | |
|---|---|---|---|
| CA | 2131654 | | 3/1996 |
| DE | 2447345 | * | 4/1976 |
| DE | 1568 03 | | 9/1982 |
| DE | 196 48 960 | | 5/1998 |

OTHER PUBLICATIONS

Meffert, A. "Technical Uses of Fatty Acid Esters" *JAOCS* (1984) vol. 61, No. 2, pp. 255-258.

Dunn, R.O. et al. "Low-Temperature Properties of Triglyceride-Based Diesel Fuels: Transesterified Methyl Esters and Petroleum Middle Distillate/Ester Blends" *JAOCS* (1995) vol. 72, No. 8, pp. 895-904.
Lee, Inmok et al. "Reducing the Crystallization Temperature of Biodiesel by Winterizing Methyl Soyate" *JAOCS* (1996) vol. 73, No. 5, pp. 631-636.
Chowdhury et al. "Vegetable Oils: From Table to Gas Tank" *Chemical Engineering* Feb. (1993) pp. 35-39.
Wessendorf, Richard. "Glycerinderivate als Kraftstoffkomponenten" *BDAG* (1995) vol. 48, No. 3, pp. 138-143.
Barnes, I. et al. "Studies on Oxygenated Fuel Additives: Ethers and Acetals" *Presentation to the US/German Environmental Chamber Workshop*, Riverside, CA (1999).
Boocock, David et al. "Fast Formation of High-Purity Methyl Esters from Vegetable Oils" *FAOCS* (1998) vol. 75, No. 9, pp. 1167-1172.
English Translation of DE 196 48 960 dated May 28, 1998.
English Translation of DD 1568 03 dated Sep. 22, 1982.
Fischer, Emil. "Über die Wechselwirkung zwischen Ester-und Alkoholgruppen bei Gegenwart von Katalysatoren (Exchange Between Ester and Alcohol Groups)" *Berichte d. D. Chem.* (1920) B. 53, pp. 1634-1645.
K.D. Mukherjee and I. Kiewitt, Appl Microbiol Biotechnol (1996) Chapter 44, pp. 557-562, entitled "Enrichment of Very-Long-Chain Mono-Unsaturated Fatty Acids by Lipase-Catalysed Hydrolysis and Transesterificaton" (On a separate sheet, Comparative Example 5 of United States Patent 6,187,939).
T.L. Brown, H.E. LeMay, Jr., and B.E. Bersten, 8th Ed, Prentice-Hall, 2000, Properties of Solutions, Chapter 13.5, entitled Colligative Properties, pp. 486 490 (On a separate sheet, the paragraph on p. 558 under the heading Amendment (U.S. Appl. No. 10/32,322) dated Oct. 8, 2008.

* cited by examiner

*Primary Examiner*—Cephia D Toomer
(74) *Attorney, Agent, or Firm*—Ladas and Parry LLP

(57) ABSTRACT

Procedure to generate biodiesel fuels with improved properties at low temperature by the transesterification of triglycerides with alcohols such as methanol or ethanol, optionally in the presence of methyl or ethyl acetates of fatty acids and an inert solvent, to produce methyl or ethyl esters of fatty acids, glycerine and, where appropriate, glycerine triacetate, followed by the separation of crude glycerine that is reacted with aldehydes, ketones and/or acetic acid or methyl or ethyl acetates to produce acetals, glycerine cetals and/or glycerine acetates. The acetals, glycerine cetals and/or glycerine acetates are mixed with methyl or ethyl esters of fatty acids in concentrations of approximately 0.5-20% by weight to obtain a biodiesel with improved properties at low temperatures.

14 Claims, No Drawings

PROCEDURE TO OBTAIN BIODIESEL FUEL WITH IMPROVED PROPERTIES AT LOW TEMPERATURE

It is known that methyl and/or ethyl esters obtained by transesterification of triglycerides with methanol and/or ethanol are used as biodiesel fuels to substitute petroleum-derived diesels. It is also known that this reaction is relatively slow and that the reaction rate can be substantially increased in the presence of inert solvents. Simple ethers such as tetrahydrofuran (THF) and methyl tert-butyl ether (MTB) are particularly effective solvents according to the Canadian patent 2.131.654 published in March, 1996.

During the transesterification, which is usually conducted in the presence of basic catalysts, relatively important amounts of crude glycerine are produced. Hence, for example, in the transesterification of soya oil with methanol approximately 20% of crude glycerine is generated for which applications must be found. The purification of this glycerine for its commercial application is a difficult and expensive procedure, even to obtain a poor quality product of doubtful value. Therefore, a procedure to transform this glycerine, via an inexpensive process, into compounds that can be mixed with biodiesel to improve its properties, especially its behavior at low temperature and improve its combustion, is a long sought after objective that would have great technical and commercial value and would solve the problem of finding an interesting application for crude glycerine. This objective can be achieved within the scope of this invention.

Currently, the relatively high price of biodiesel compared to diesel oils derived from petroleum is the main obstacle to their complete commercial acceptance. One way to make these procedures more economically viable would be to find new applications for crude glycerine. The procedures proposed to date for the use of crude glycerine are unsatisfactory and include mixing it with animal manure to produce fertilizers or incorporating it into animal feed. These applications are described, for example, in the article titled "Technical Uses of Fatty Acid Esters", Meffert, JAOCS, vol. 61, February 1984.

It is also known that the use of biodiesel fuels, comprised by methyl esters of fatty acids is limited in practice by their inferior properties at low temperature. For example, they present cloud points (lowest temperature at which a fluid can remain as a fluid without becoming turbid or beginning to crystallize) of almost zero (0) degrees centigrade whereas the petroleum-derived diesels present typical values of around −16° C. A similar difference is found with the freezing points that are around −2° C. for biodiesel oils and are around −27° C. for petroleum-derived diesels (see for example the article "Low Temperature Properties of Triglyceride-Based Diesel Fuels: Transesterified Methyl Esters and Petroleum Middle distillate/Ester Blends, Dunn et al., JAOCS, vol 72, No 8, 1995). These inferior properties of the biodiesel compared to conventional diesels, with the subsequent reduction in fluidity at low temperature, causes problems such as the trapping of fuel filters in Diesel engines under 0° C.

As a consequence, the use of biodiesel in cold weather cannot be generalized until this problem has been solved. Proposed solutions include so-called "winterization", discussed in the article titled "Reducing the Crystallization Temperature of Biodiesel by Winterizing Methyl Soyate", Lee et al. JAOCS, vol 73, No 5, 1996, the biotechnological application to generate biodiesel with improved specifications as described in "Vegetable Oils: From Table to Gas Tank", Chowdhury et al. Chem. Eng. February 1993, and the mixture of methyl esters of fatty acids with etherized glycerine, U.S. Pat. No. 6,174,501, January 2001. In the U.S. Pat. No. 5,520,708, March 1996, the reaction of triglycerides with methanol are described in the presence of a base to produce methyl esters and a specific treatment to reduce the cloud point are described. However, the use of glycerine acetals or cetals to reduce the cloud point and the viscosity of methyl or ethyl esters of fatty acids are not mentioned.

The article "Glycerinderivate als Kraftstoffkomponon-enten", R. Wessendorf, Erdol und Kohle-Erdgas, 48, 3, 1995, describes the ethers, esters and glycerine oils as useful components of petrols but does not mention the effects the acetals have of reducing the viscosity and in general improving the properties in cold of their mixtures with methyl or ethyl esters of fatty acids.

Similarly, it is known (I. Barnes et al., presentation to the US/German Environmental Chamber Workshop, Riverside, Calif., Oct. 4-6, 1999) that the addition of acetals to diesel oils slightly improves the environmental characteristics of their exhaust gases. For example, trials on methylal additions ($CH_2(OCH_3)_2$ and n-butylal ($C_4H_9OCH_2OC_4H_9$) to diesel oils of petroleum origin have demonstrated that the emission of particles and of $NO_x$ are greatly reduced and in the case of butylal the cetane number is also improved. However, the effect of improving the properties of the diesel oils in cold by acetal addition is not mentioned.

DESCRIPTION OF THE INVENTION

It is known that when triglycerides are reacted (vegetable oils or animal fats) with alcohols in known transesterification processes mixtures are obtained with approximately 80% fatty acid esters (usually methyl or ethyl esters) together with approximately 20% crude glycerine, the commercial application of which is problematic. This problem has been solved in the framework of this invention by converting the crude glycerine into acetals, cetals, and/or glycerine triacetate. The mixture of these products with methyl or ethyl esters of fatty acids permits biodiesel fuels to be obtained with improved properties, especially at low temperatures, the production potential of biodiesel fuels to be increased and avoids the need to find alternative markets for crude glycerine that generally require laborious and expensive purification procedures.

Crude glycerine is inherently insoluble in methyl or ethyl esters of fatty acids. However, if this glycerine is reacted with aldehydes, ketones and/or acetic acid or methyl or ethyl acetates, the corresponding cetals, acetals and/or acetic acid or glycerine triacetate obtained, are completely soluble in these methyl or ethyl esters of fatty acids and reduce their viscosity and freezing point, making this greatly superior to biodiesel fuels obtained according to the current art.

Therefore, the procedure of the invention includes the following basic steps:

(1) Transesterifying triglycerides by reaction with an alcohol, preferably methanol or ethanol, in the presence of acid or basic catalysts, to produce methyl or ethyl esters of fatty acids and crude glycerine.

(2) Isolating the crude glycerine obtained as a secondary product.

(3) Making all or part of the crude glycerine obtained in 2) react with aldehydes, ketones and/or acetic acid or methyl or ethyl acetates to obtain the corresponding acetals, cetals, glycerine acetates and;

(4) Mixing acetals, cetals or glycerine acetates with the methyl or ethyl esters of the fatty acids.

According to a preferred procedure within the scope of the invention, the transesterification stage (1) of the triglycerides with methanol or ethanol is made in the presence of methyl or ethyl acetates, respectively, or where appropriate in the presence of an inert solvent. Surprisingly, we discovered that when the reaction of transesterification of the triglycerides with methanol or ethanol is conducted in the presence of methyl or ethyl acetate, or optionally in the presence of another inert solvent, the reaction takes place at a high rate, in reaction times shorter than 1 hour and usually shorter than 15 mm at temperatures from 25-60° C. Also, part or all of the glycerine is transformed into glycerine acetates. Without limiting ourselves to any one theory, the methyl or ethyl acetates possibly react with the triglycerides at a higher rate than methanol or ethanol to generate glycerine acetates and methyl esters of the fatty acids. Hence, use of methyl or ethyl acetates in the transesterification stage, according to the invention means that reaction times can be reduced and the process can be simplified since part or all of stage (2), corresponding to the isolation of crude glycerine, and of stage (3), corresponding to the reaction of crude glycerine with aldehydes, and stage (4) concerning mixing the methyl or ethyl esters of the fatty acids with acetals, cetals and glycerine acetates, can be omitted. This leads to a reduction in the overall costs of the process and, therefore, to an important additional economic benefit.

According to the invention, the triglycerides can correspond to any vegetal oil or animal fat, for example coconut oil, palm oil, seed oil, olive, sunflower, soya, rape-seed oil, tallow, etc. The transesterification reaction of the vegetable or animal oils in the presence of an alcohol such as methanol or ethanol, can be made according to procedures well-known in the art, such as using catalysts like sodium alkoxide, sodium or potassium hydroxide etc. Also, acid catalysts can be used such as sulphuric acid, hydrogen chloride and boron trifluoride. The acid catalysts are particularly appropriate when the oils contain relatively large amounts of fatty acids. The amount of catalyst is usually between 0.1, and 1% by weight in relation to the oil. The preferred procedure for the transesterification according to the invention is carried out in the presence of methyl or ethyl acetate and, where appropriate, in the presence of an inert solvent, for example an ether such as tetrahydrofuran, methyl tert-butyl ether, diisopropyl ether etc.

Separation of the crude glycerine from the transesterified triglycerides can be made following procedures well-known in the art, for example by elutriation or centrifugation. Transesterified triglycerides can also be purified by known procedures, for example by neutralising the catalytic residues with acids or bases, followed by rinsing several times with water. When methyl or ethyl acetates are used and/or some inert solvent in the transesterification stage, the separation of crude glycerine from methyl or ethyl esters of the fatty acids is preferably made after eliminating the excess methyl or ethyl alcohol and, where appropriate, the methyl or ethyl acetates and those of the inert solvent, for example by distillation or flash.

The crude glycerine, without requiring any preliminary purification stage, is reacting with the aldehydes and ketones according to known procedures, for example, as described in the patent Ger. Offen DE 19648960, 1988, to produce glycerine acetals and cetals.

For the aldehydes, and in the framework of the present invention, aldehydes $C_1$-$C_{12}$ for example aliphatic aldehydes such as formaldehyde, acetaldehyde, n-propanal, isopropanal, n-butanal, isobutanal, n-pentanal, isopentanal, 2-ethylhexanal etc., unsaturated hexanals such as acrolein and crotonaldehyde and aromatic aldehydes such as benzaldehyde can be used. For the ketones, ketones $C_3$-$C_{12}$, for example aliphatic ketones such as acetone, butanone, 2-pentanone, 3-pentanone, 4-methyl-2-pentanone, 2-decanone, etc., unsaturated ketones such as 3,5,5, trimethyl-2-cyclohexen-1-one, 4-methyl-3-penten-2-one, 3-buten-2-one and aromatic ketones such as acetophenone.

The preparation of glycerine triacetate from crude glycerine can be made by known procedures, by esterification of glycerine with acetic acid or by transesterification with methyl or ethyl acetates, for example, according to the procedure recommended in patent DDR 156803 (1981).

According to the present invention, the concentration of acetals, cetals and/or glycerine acetate in mixtures of methyl or ethyl esters of fatty acids can vary between very wide limits, although concentrations from 0.5-1%, by weight, are usually sufficient to improve properties at low temperatures if all the crude glycerine obtained in the transesterification is to be used concentrations of up to 20% can be employed. In any case, an skilled in the art can easily determine the optimum concentration of acetals, cetals and/or glycerine acetate or mixtures of these compounds in each case, depending on the nature of the triglyceride used, whether these be of the acetal, cetal or glycerine acetate types and of the degree of improvement of the properties at low temperatures desired for the final product. In general, when triglycerides of animal origin are used as the raw material, for example tallow, the corresponding methyl or ethyl esters of the fatty acids have relatively high freezing points owing to the saturated character of their fatty acids and require higher concentrations of glycerine acetals or cetals in the mixtures to achieve the same behavior at low temperatures than when methyl or ethyl esters of more unsaturated fatty acids of vegetable origin are used.

The mixtures of acetals, cetals and/or glycerine acetate with the methyl or ethyl esters of the fatty acids can also be used to advantage in mixtures with diesels of petroleum origin to improve the behavior at low temperatures in relation to the corresponding binary mixtures of methyl or ethyl esters and diesels.

The following examples illustrate the nature of the invention but do not restrict its application in any way.

Example 1

Stage (1)

Preparation of Methyl Ester of Soya Oil

The preparation is made according to the procedure described by David GBoocock in JAOCS, 75, 9 (1998). This involves introducing 1 kg of soya oil, 1 litre of anhydrous tetrahydrofuran, 1 litre of methanol and 10 grams of sodium hydroxide (1% by weight relative to the oil) into a glass flask furnished with a stirring device. The mixture is heated, while stirring constantly, to 50° C. for 30 minutes.

Stage (2)

Isolation of the Crude Glycerine

The reaction mixture obtained in example 1 is distilled to eliminate the unreacted methanol and the inert solvent, tetrahydrofuran, leaving a distillation residue comprised of two liquid phases: one phase of methyl esters and a glycerine phase, that were separated by centrifugation. The methyl esters were finally washed with water. A yield of 99% is obtained with methyl esters.

Stage (3)

Reaction of Commercial Glycerine with Acetone (Comparative)

Commercial glycerine is reacted with acetone, according to the procedure described in the patent application DE 19648960, to obtain glycerine cetal.

This involves mixing 55.6 g of commercial glycerine and 139.6 g of acetone with 0.047 g p-toluensulphonic acid monohydrate. The reaction mixture is heated for 30 minutes at reflux. Next, the acetone is distilled, adding a continuous simultaneous acetone flow to the reactor for 12 hours. The amount of dry acetone introduced was 512 grams. Finally, 0.094 g of sodium methoxide was added to neutralise the catalyst and to stop the reaction and the excess acetone was eliminated by distillation. The purity of the product, analysed by chromatography, was 99.1%.

Stage (3bis)

Reaction of Crude Glycerine with Acetone

Stage (3) described above was repeated but this time instead of the commercial glycerine 55.6 g of crude glycerine obtained in stage (2) was used after centrifugation and prior neutralisation to pH 7 with sulphuric acid. Glycerine cetal was obtained with a purity of 98.9%, demonstrating that the crude glycerine obtained in processes of glyceride transesterification with alcohols catalaysed by bases is suitable for the manufacture of glycerine cetals.

Stage (4)

Mixing the Glycerine Cetal with Methyl Esters of Fatty Acids

One hundred grams of methyl esters of fatty acids obtained in stage (2) were mixed with 10 g of glycerine cetal obtained (3) by the reaction of crude glycerine and acetone. A biodiesel fuel was obtained with improved properties at low temperature.

Example 2

Stage (1)

Methyl esters were prepared with rape-seed as indicated in stage (1) of example (1), replacing soya oil by rape-seed oil.

Stage (2)

The crude glycerine was isolated according to the procedure described in stage (2) of Example 1.

Stage (3)

Glycerine formal was prepared from crude glycerine obtained in stage (2) using the procedure described in patent DE 196 48960. Glycerine formal with a 99% purity contained 175 ppm and less than 1% water.

Stage (4)

Mixtures of rape-seed methyl esters obtained in stage (2) and glycerine formal obtained in stage (3) with concentrations of the latter of 0.5, 1, 5 and 10% by weight were prepared. Table 1 shows the results obtained and reveals the reduced freezing points and viscosity of methyl esters of fatty acids (biodiesel) that can be obtained according to the invention.

TABLE 1

| | Mixtures of rape-seed methyl esters (RME) and Glycerol Formal | | | | |
|---|---|---|---|---|---|
| PARAMETERS | RME | RME + 0.5% Glycerol formal | RME + 1% Glycerol formal | RME + 5% Glycerol formal | RME + 10% Glycerol formal |
| Density, gcm-3 | 0.8592 | 0.8620 | 0.8631 | 0.8711 | 0.8802 |
| Freezing point, ° C. | −7 | −16 | −21 | −21 | −21 |
| Viscosity, Cst at: −10° C. | Not measurable | — | 548.2 | 343.3 | — |

Example 3

Stage (1)

Methyl esters from rape-seed were prepared as described in stage (1) of example 1 but by replacing soya oil by rape-seed oil.

Stage (2)

Crude glycerine was isolated according to the procedure described in stage (2) of example 1.

Stage (3)

Glycerine triacetate was prepared by the reaction of crude glycerine obtained in stage (2) with methyl acetate in the presence of potassium hydroxide as a catalyst, according to the procedure described by E. Fischer, B.53, 1640 (1920).

Stage (4)

Mixtures of methyl esters of rape-seed obtained in stage (2) and glycerine triacetate, prepared in stage (3), with concentrations of the latter at 1, 5 and 10% by weight were prepared. Table 2 shows the results obtained and shows the reduction in freezing points and in the viscosity of the rape-seed methyl esters (biodiesel) that can be achieved according to the procedure of the invention.

TABLE 2

Mixtures of rape-seed methyl esters (RME) and glycerine triacetate

| PARA-METERS | RME | RME + 1% Glyceryl triacetyl | RME + 5% Glyceryl triacetyl | RME + 10% Glyceryl triacetyl |
|---|---|---|---|---|
| Density, gcm-3 | 0.8592 | 0.8615 | 0.8689 | 0.8806 |
| Freezing point, °C. | −7 | −16 | −16 | −17 |
| Viscosity, Cst at: −10° C. | Not measurable | Not measurable | 931.2 | 453.9 |

Example 4

Stage (1)

Methyl esters of sunflower oil were prepared. To do this a mixture of 75 g of sunflower oil, 30 g methanol, 37 grams methyl acetate and 0.75 g of 1% NaOH was prepared. The mixture was heated to 60° C. for 15 minutes.

Stage (2)

The reaction product obtained in stage (2) was distilled, recovering from the top the methanol and methyl acetate that had not reacted. The distillation residue was comprised of a mixture of methyl esters of sunflower and glycerine acetate and only contained traces of glycerine. This residue was washed with water to eliminate the catalyst and traces of glycerine. The freezing point of the washed residue was −17° C.

Stages (3) and (4) were omitted.

The invention claimed is:

1. In a process to produce a biodiesel fuel comprising the step of transesterifying a triglyceride comprising a vegetable oil or animal fat with methanol or ethanol in the presence of an acid or base catalyst to produce a mixture of methyl or ethyl esters of fatty acids and crude glycerine; the improvement wherein the transesterifying is carried out in the presence of methyl or ethyl acetate, wherein the transesterifying step is a first step (a), and the process further comprises the steps of
   (b) isolating the crude glycerine from the mixture;
   (c) reacting some or all of the crude glycerine isolated in step (b) with an aldehyde, ketone, acetic acid, methyl acetate or ethyl acetate to obtain an acetal, ketal, glycerine acetate or a mixture thereof as reaction product; and
   (d) mixing the reaction product of step (c) with the methyl or ethyl esters of fatty acids obtained in step (a) to produce the biodiesel fuel,
wherein in step (d) the mixture formed by mixing the reaction product of step (c) with the methyl or ethyl esters of fatty acids contains between about 0.1 and 20% by weight of the acetal, ketal, glycerine acetate or mixture thereof.

2. In a process to produce a biodiesel fuel comprising the step of transesterifying a triglyceride comprising a vegetable oil or animal fat with methanol or ethanol in the presence of an acid or base catalyst to produce a mixture of methyl or ethyl esters of fatty acids and crude glycerine; the improvement wherein the transesterifying is carried out in the presence of methyl or ethyl acetate, wherein the transesterifying step is a first step (a), and the process further comprises the steps of
   (b) isolating the crude glycerine from the mixture;
   (c) reacting some or all of the crude glycerine isolated in step (b) with an aldehyde, ketone, acetic acid, methyl acetate or ethyl acetate to obtain an acetal, ketal, glycerine acetate or a mixture thereof as reaction product; and
   (d) mixing the reaction product of step (c) with the methyl or ethyl esters of fatty acids obtained in step (a) to produce the biodiesel fuel, wherein in step (d) the mixture formed by mixing the reaction product of step (c) with the methyl or ethyl esters of fatty acids contains the acetal, ketal, glycerine acetate or mixture thereof in an amount effective to lower the freezing and viscosity point of the biodiesel fuel as compared with the biodiesel fuel without the acetal, ketal, glycerine acetate or mixture thereof.

3. The process according to claim 2, further comprising the step (e) of mixing the biodiesel fuel with a diesel fuel comprising petroleum distillates.

4. A biodiesel fuel composition consisting essentially of a mixture of a biodiesel fatty acid methyl or ethyl ester and glycerine triacetate, said glycerine triacetate being solubilized in the biodiesel fatty acid methyl or ethyl ester to reduce the viscosity and freezing point of the biodiesel fuel as compared with the viscosity and freezing point of the biodiesel fuel without the glycerine triacetate, wherein the glycerine triacetate is present in a concentration of 0.1 to 20 wt %.

5. A biodiesel fuel composition according to claim 4, wherein the glycerine triacetate is present in a concentration of 0.5 to 20 wt %.

6. A biodiesel fuel composition according to claim 4, further comprising a diesel composition from petroleum distillation.

7. A method for reducing viscosity or freezing point of a biodiesel fuel comprising the step of admixing the biodiesel fuel with a glycerine triacetate to form a mixture consisting essentially of a biodiesel fatty acid methyl or ethyl ester and the glycerine triacetate, said glycerine triacetate being solubilized in the fatty acid methyl or ethyl ester to reduce the viscosity and freezing point of the biodiesel fuel as compared with the viscosity and freezing point of the biodiesel fuel without the glycerine triacetate, wherein the glycerine triacetate is present in the mixture in an amount effective to reduce the viscosity or freezing point of the bio diesel fuel, wherein the glycerine triacetate is present in the mixture in a concentration of from 0.1-20 wt %.

8. The method according to claim 7, wherein the glycerine triacetate is present in the mixture in a concentration of from 0.5-20 wt %.

9. The method according to claim 4, wherein the biodiesel comprises a mixture of methyl or ethyl esters.

10. The biodiesel fuel composition according to claim 4, wherein the fatty acid ester is a methyl ester and wherein the fatty acid methyl ester and the glycerine triacetate are present in the composition in respective amounts such that the composition has a freezing point that is lower than −2° C.

11. The biodiesel fuel composition according to claim 4, wherein the fatty acid ester is a rape-seed methyl ester and wherein the rape-seed methyl ester and the glycerine triacetate are present in the composition in respective amounts such that the composition has a freezing point that is as low as −17° C.

12. A method comprising fueling a diesel engine with the biodiesel fuel composition according to claim 4.

13. A method comprising fueling a diesel engine with the biodiesel fuel composition according to claim 10.

14. A method comprising fueling a diesel engine with the biodiesel fuel composition according to claim 11.

* * * * *

UNITED STATES PATENT AND TRADEMARK OFFICE
CERTIFICATE OF CORRECTION

| | | |
|---|---|---|
| PATENT NO. | : 7,637,969 B2 | Page 1 of 1 |
| APPLICATION NO. | : 10/329322 | |
| DATED | : December 29, 2009 | |
| INVENTOR(S) | : Juan Delgado Puche | |

It is certified that error appears in the above-identified patent and that said Letters Patent is hereby corrected as shown below:

Title Page, should read (*) Notice: Subject to any disclaimers, term of this patent is extended or adjusted under 35 U.S.C. 154(b) by 1052 days.

On Title Page, please insert Item [30] priority --SPAIN 200200103 01/18/2002--

Signed and Sealed this

Third Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,637,969 B2  Page 1 of 1
APPLICATION NO. : 10/329322
DATED : December 29, 2009
INVENTOR(S) : Delgado Puche It is certified that error appears in the above-identified patent and that said Letters Patent is hereby corrected as shown below:

On the cover page, (*) Notice:   Subject to any disclaimer, the term of this patent is extended or adjusted under 35 U.S.C. 154(b) by 563 days.

Delete the phrase "by 563 days" and insert -- by 1052 days --

Signed and Sealed this

Tenth Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,637,969 B2  Page 1 of 1
APPLICATION NO. : 10/329322
DATED : December 29, 2009
INVENTOR(S) : Juan Delgado Puche It is certified that error appears in the above-identified patent and that said Letters Patent is hereby corrected as shown below:

This certificate vacates the Certificate of Correction issued August 10, 2010. The certificate is a duplicate of the Certificate of Correction issued August 3, 2010. All requested changes were included in the Certificate of Correction issued August 3, 2010.

Signed and Sealed this

Fourteenth Day of September, 2010

David J. Kappos
*Director of the United States Patent and Trademark Office*